United States Patent
Khazen et al.

(10) Patent No.: US 10,983,292 B1
(45) Date of Patent: Apr. 20, 2021

(54) QSFP-DD BACKSHELL

(71) Applicant: Mellanox Technologies, Ltd., Yokneam (IL)

(72) Inventors: Nimer Khazen, Baena (IL); Jamal Mousa, Haifa (IL); Alona Bain Najmanovich, Yokneam Illit (IL)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

(21) Appl. No.: 16/687,893

(22) Filed: Nov. 19, 2019

(51) Int. Cl.
| | | |
|---|---|---|
| *G02B 6/42* | (2006.01) | |
| *H01R 13/627* | (2006.01) | |
| *H01R 13/6583* | (2011.01) | |
| *H04B 10/80* | (2013.01) | |
| *H04B 10/40* | (2013.01) | |

(52) U.S. Cl.
CPC ......... *G02B 6/4284* (2013.01); *G02B 6/4293* (2013.01); *H01R 13/6273* (2013.01); *H01R 13/6583* (2013.01); *H04B 10/40* (2013.01); *H04B 10/801* (2013.01)

(58) Field of Classification Search
CPC ................ G02B 6/4284; G02B 6/4293; H01R 13/6583; H01R 13/6273; H04B 10/801
See application file for complete search history.

(56) References Cited

U.S. PATENT DOCUMENTS

| | | | | |
|---|---|---|---|---|
| 2004/0117981 | A1* | 6/2004 | Roth | G02B 6/3869 29/828 |
| 2009/0035990 | A1* | 2/2009 | McCarthy | H01R 9/0518 439/585 |
| 2012/0204413 | A1* | 8/2012 | Hedrick | B25F 1/003 29/566.4 |
| 2015/0083455 | A1* | 3/2015 | Keith | H01R 24/28 174/73.1 |
| 2019/0326694 | A1* | 10/2019 | Zhao | H01R 13/506 |
| 2020/0341208 | A1* | 10/2020 | Verheyden | G02B 6/3849 |

* cited by examiner

*Primary Examiner* — Jean F Duverne
(74) *Attorney, Agent, or Firm* — Alston & Bird LLP

(57) ABSTRACT

Presented herein is a backshell of a Quad Small Form-factor Pluggable Double Density (QSFP-DD) plug configured to be connected to the end of a QSFP-DD copper cable. The backshell includes an over-mold strain relief and 16 pairs of 26 AWG copper conductors. The backshell defines external dimensions and shape that are compliant with the industry standards for a QSFP backshell.

16 Claims, 5 Drawing Sheets

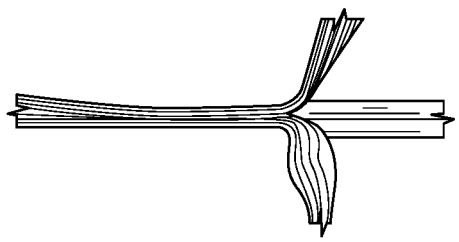
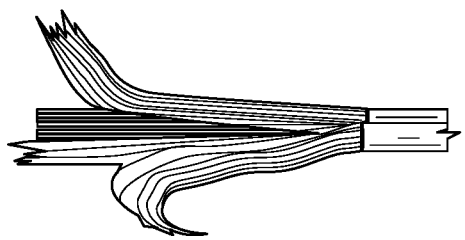
Fig. 4A　　　　　　　Fig. 4B
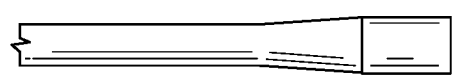
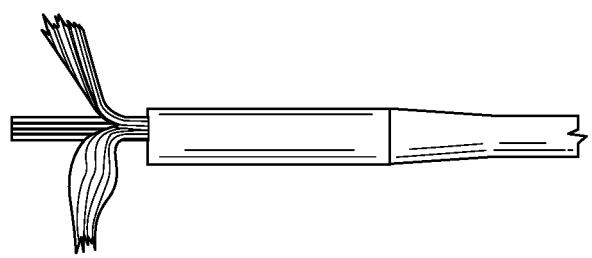
Fig. 4C　　　　　　　Fig. 4D
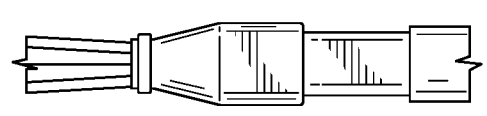
Fig. 4E　　　　　　　Fig. 4F

QSFP-DD BACKSHELL

TECHNOLOGICAL FIELD

The invention is from the field of copper cables for telecommunication and data communication systems. Specifically, the invention relates to Quad Small Form-factor Pluggable Double Density (QSFP-DD) copper cable designs. More specifically the invention relates to the backshell of the plugs connected to the ends of QSFP-DD copper cables.

BACKGROUND

Quad Small Form-factor Pluggable Double Density (QSFP-DD) cables comprise 16 twisted pairs of cables to form eight channels. Theoretically, a QSFD-DD copper cable is able to transfer data at a rate of 400 GBS; however, at present this data transfer rate has been achieved only over short distances because of the difficulty of integrating thicker cable into the design. The reason for this is that, in order to be compatible with the QSFP-DD standard and legacy systems, the dimensions of the backshell are such that to date it has been possible to utilize cables comprising copper conductors having a maximum diameter of 27 AWG. In order to reliably achieve the full bandwidth at longer distances, e.g. three meters, larger diameter conductors must be used.

It is a purpose of the present invention to provide a QSFD-DD connector backshell that is modified to allow use of 26 AWG copper conductors and an over-mold strain relief.

It is another purpose of the invention to provide a method of bundling at least two bulk cables that together comprise 16 twisted pairs of 26 AWG copper conductors to allow the bundled cable to fit into a QSFD-DD connector backshell.

Further purposes and advantages of this invention will appear as the description proceeds.

BRIEF SUMMARY

In a first aspect the invention is a backshell of a Quad Small Form-factor Pluggable Double Density (QSFP-DD) plug configured to be connected to the end of a QSFP-DD copper cable. The backshell has external dimensions and shape which are compliant with the industry standards for a QSFP backshell. The backshell comprises:
  a) a locking latch comprising a top side and a side part;
  b) a pull tab comprising two sections that are located on opposite sides of the top side of the locking latch;
  c) a circular cable inlet located through an end wall of the backshell; and
  d) a circular groove located in the cable inlet;
  wherein:
  i) the edge of the top side of the locking latch ends at a location spaced away from the end wall of the backshell and the two sections of the pull-tab are connected by two strips of connecting piece that passes under the top side of the locking latch leaving a portion of the end wall of the backshell between them the two strips;
  ii) a part of the portion of end wall is cleared away to enlarge the diameter of the cable inlet to the backend of the connector; and
  iii) the circular groove located in the cable inlet and end wall of the backshell are configured to allow a flange on an over-molded strain relief to fit into the groove and to allow the end wall of the backshell to fit into a circumferential groove on the over-molded strain relief, thereby preventing separation of the QSFP-DD copper cable from the QSFP-DD connector.

In embodiments of the backshell that are adapted to connect to a QSFP-DD copper cable, the cable is a bundled cable formed by bundling at least two bulk cables that together comprise 16 twisted pairs of copper conductors.

In some embodiments of the backshell, the diameter of the copper conductors in the bundled cable is 26 American Wire Gauge (AWG).

A second aspect the invention is a backshell and cable assembly comprising a backshell of the first aspect and a QSFP-DD copper cable, which is a bundled cable formed by bundling at least two bulk cables that together comprise 16 twisted pairs of copper conductors.

In some embodiments of the assembly, the diameter of the copper conductors is 26 American Wire Gauge (AWG).

In some embodiments of the assembly, the bundled cable is formed from one of:
  a) two bulk cables each containing eight twisted pairs of copper conductors;
  b) four bulk cables each containing four twisted pairs of copper conductors;
  c) eight bulk cables each containing two twisted pairs of copper conductors; and
  d) sixteen bulk cables each containing two twisted pairs of copper conductors.

In some embodiments of the assembly, the bulk cables are bundled together to form a bundled cable according to the following steps:
  a) a length of the outer jacket of each bulk cable is removed to expose the twisted pairs of conductors and the braiding of each bulk cable is pulled back and untangled;
  b) the exposed lengths of the pairs of conductors from all bulk cables are bundled together by wrapping a thermally and electrically insulating film around them;
  c) the cable shielding braid is arranged to minimize the thickness of the bundle;
  d) the combined pairs are wrapped with glue covered cloth to simulate a single 16 pair bulk cable;
  e) a section of the pairs from which the outer jacket was removed in the first step and part of the unremoved jacket on the bulk cables is covered with a heatshrink;
  f) a strain relief is over-molded onto the bundled pairs and partially covering the heatshrink; and
  g) copper foil tape is wrapped around the shielding braid of the bundle of pairs of conductors after the over-molded strain relief.

In some embodiments of the assembly, the thermally and electrically insulating film in the bundled cable is Kapton® manufactured by DuPont or the like.

In some embodiments of the assembly, the glue covered cloth in the bundled cable is Acetate Cloth Electrical Tape manufactured by 3M™ or the like.

In some embodiments of the assembly, spacers are added under the cloth to maintain the shape of the bundle.

In some embodiments of the assembly, the heatshrink material in the bundled cable is Heat Shrink Thin-Wall Tubing manufactured by 3M™.

A third aspect of the invention is a method for manufacturing a backshell and cable assembly comprising a backshell as claimed in the first aspect, and a QSFP-DD copper cable, which is a bundled cable formed by bundling at least two bulk cables that together comprise 16 twisted pairs of copper conductors, comprising the steps of:

a) removing a length of the outer jacket of each bulk cable to expose the twisted pairs of conductors and the braiding of each bulk cable is pulled back and untangled;
b) bundling the exposed lengths of the pairs of conductors from all bulk cables together by wrapping a thermally and electrically insulating film around them;
c) arranging the cable shielding braid to minimize the thickness of the bundle;
d) wrapping the combined pairs with glue covered cloth to simulate a single 16 pair bulk cable;
e) covering a section of the pairs from which the outer jacket was removed in the first step and part of the unremoved jacket on the bulk cables with a heatshrink;
f) over-molding a strain relief onto the bundled pairs and partially covering the heatshrink; and
g) wrapping copper foil tape around the shielding braid of the bundle of pairs of conductors after the over-molded strain relief.

In some embodiments of the method, the thermally and electrically insulating film in the bundled cable is Kapton® manufactured by DuPont or the like film.

In some embodiments of the method, the glue covered cloth in the bundled cable is Acetate Cloth Electrical Tape manufactured by 3M™ or the like.

In some embodiments of the method, spacers are added under the cloth to maintain the shape of the bundle.

In some embodiments of the method, the heatshrink material in the bundled cable is Heat Shrink Thin-Wall Tubing manufactured by 3M™ or the like.

All the above and other characteristics and advantages of the invention will be further understood through the following illustrative and non-limitative description of embodiments thereof, with reference to the appended drawings.

BRIEF DESCRIPTION OF THE DRAWINGS

FIGS. 4A to 4F are photographic images that illustrate the stages of a process for bundling 16 pairs of conductors from at least two bulk cables and attachment of an over-mold strain relief to the bundle.

DETAILED DESCRIPTION

The technical problem addressed by this invention is how to increase the data transfer speed of a QSFP-DD cable and in particular how to increase the distance over which data can be reliably transferred at high speeds. In one particular embodiment the invention allows increasing the data transfer speed of a standard three meter long QSFP-DD cable, from the presently available value to a maximum value of 400 GBS. In this instance, the invention makes it possible to replace the presently used maximum 27 AWG copper conductors in the cable with larger diameter 26 AWG conductors, which requires overcoming the additional technical problem of how to insert a bulk cable comprising an over-mold strain relief and 16 pairs of 26 AWG copper conductors into a small form factor industry standards compliant QSFP-DD backshell. The solution to the problem provided herein has two parts. The first part of the solution is to provide more space inside the backshell to accommodate the larger diameter cable and the strain relief and to allow a larger diameter cable inlet than in the prior art. The second part of the solution is to bundle the cable such that its overall diameter allows it to pass through the enlarged cable inlet of the backshell.

While in the description to follow reference is made to 26 AWG conductors, which are important standard set-ups in the field, the invention is not limited to any specific cable, and one of ordinary skill in the art in light of the present disclosure will appreciate that the invention can be advantageously used, mutatis mutandis, with different cases and backshells.

Figure 1:
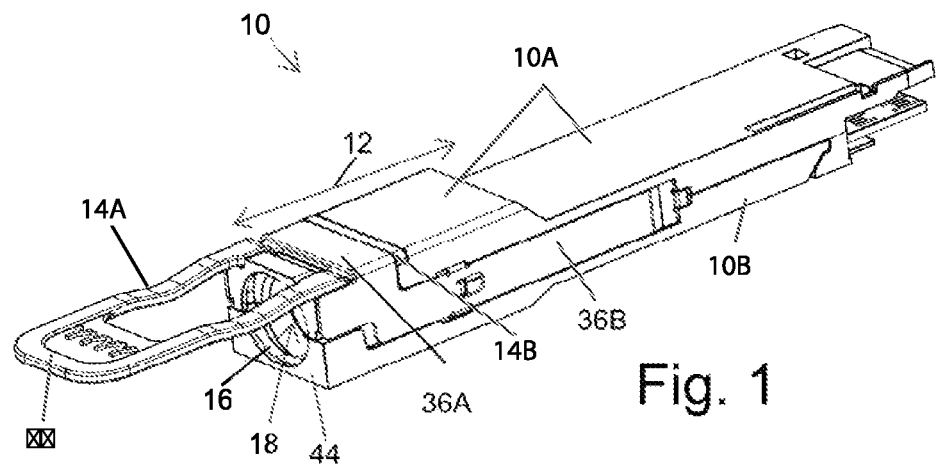
FIG. 1 schematically shows the connector of the QSFP-DD cable connector of the invention.
Figure 2:
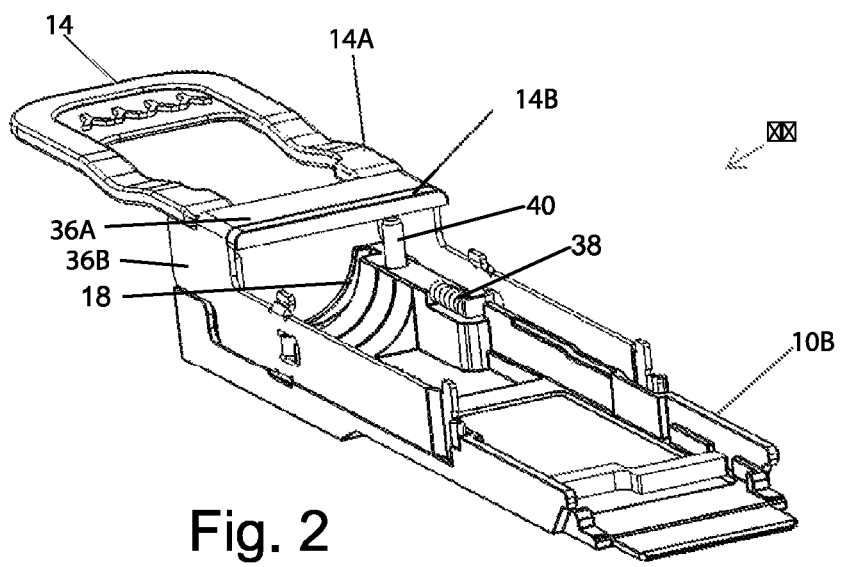
FIG. 2 schematically shows the interior of the connector of FIG. 1.

FIG. 1 schematically shows a QSFP-DD cable connector 10 according to one embodiment of the invention and FIG. 2 schematically shows the bottom 10B and interior of connector 10, with the top 10A removed. The backshell portion of connector 10 is roughly the part of the connector indicated by arrow 12. The cable enters the backshell through circular cable inlet 16. Also seen in these figures are top side of the locking latch 36A and the side part of the locking latch 36B, pull-tab 14 (comprised of a single part having two sections 14A and 14B that are connected as will be described herein below with reference to FIGS. 10B and 11B), some of the screws 40 that are used to attach the top of the connector 10 and close the assembly after the cable is inserted, and one of the springs 38 that cause the return of the locking latch to a closed position after the pull-tab 14, which has been pulled back from the end wall 44 of connector 10, is released (a spring on the opposite side of the interior of connector 10 is not seen in FIG. 2) and a circumferential groove 18 whose function as part of the strain relief will be described herein below.

Figure 10A:
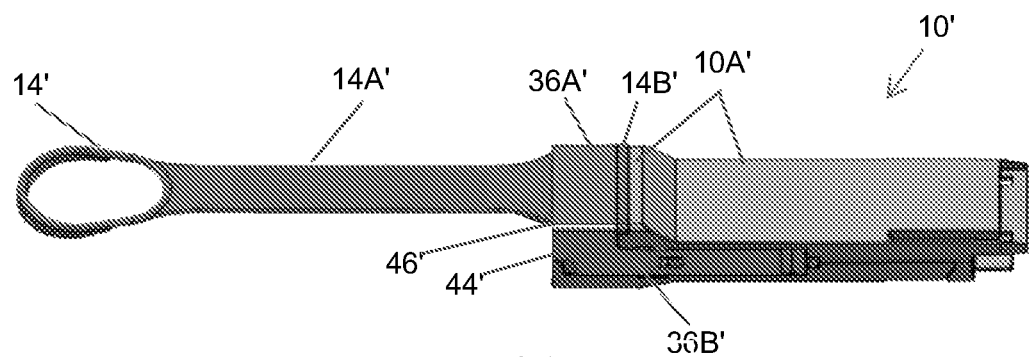
FIG. 10A schematically shows a prior art QSFP connector.

FIG. 10A schematically shows a prior art QSFP connector 10'. In connector 10', when the locking latch is in a closed position, the edge 46' of the top side 36A' of the locking latch is even with the end wall 44' of the connector 10'. The pull-tab 14' is comprised of two parts 14A' and 14B' that are located on opposite sides of the top side 36A' of the locking latch. The two parts of pull tab 14' are connected by a connecting piece 48' (see FIG. 11A) having the full width of connector 10' that passes under the top side 36A' of the locking latch.

Figure 11A:
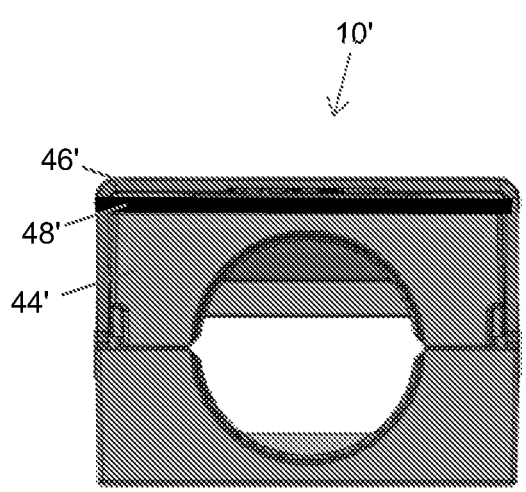
FIG. 11A is an end view of the prior art connector of FIG. 10 A.

FIG. 11A is an end view of prior art connector 10 with the pull-tab and cable removed. In this figure it can be seen how the connecting piece 48' of the pull tab 14' occupies a space that has the entire width of connector 10' under the top side 36A' of the locking latch.

Figure 10B:
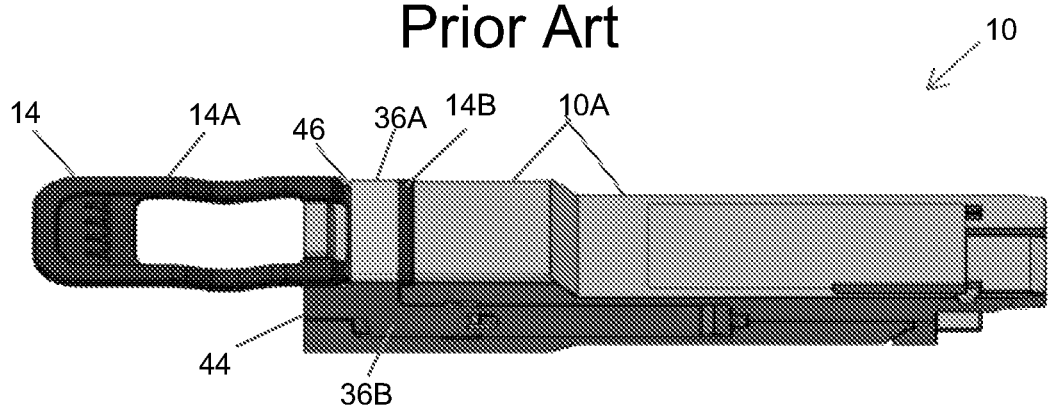
FIG. 10B schematically shows an embodiment of a QSFP-DD connector of the invention'.

FIG. 10B schematically shows a QSFP-DD connector 10 according to one embodiment of the invention. In connector 10, when the locking latch is in a closed position, the edge 46 of the top side 36A of the locking latch ends at a location spaced away from the end wall 44 of the connector 10. The pull-tab 14 is manufactured as a single piece comprised of two sections 14A and 14B located on opposite sides of the top side 36A' of the locking latch. The two sections of the pull-tab 14 are connected by two strips of connecting piece 48 (see FIG. 11B) that pass under the top side 36A of the locking latch and leave a portion of end wall 44 of connector 10 between them.

Figure 11B:
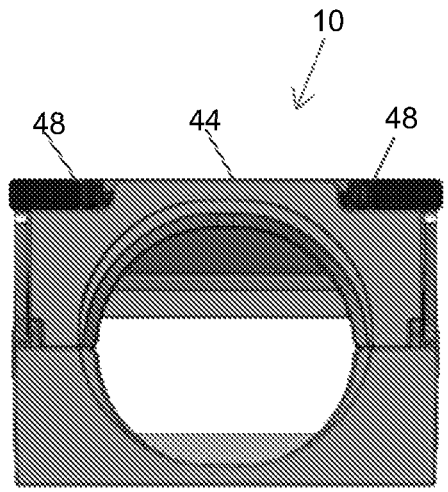
FIG. 11B is an end view of the connector of FIG. 10 B.

FIG. 11B is an end view of connector 10 with the pull-tab and cable removed. In this figure it can be seen how the connecting strips 48' of the pull tab 14' leave a portion of the back wall 44 of connector 10 under the top side 36A of the locking latch. A part of this portion of end wall is cleared away to enlarge the diameter of the cable inlet to the backend of connector 10 (as indicated schematically by the larger diameter circle in FIG. 11B).

It is to be noted that the end walls of the prior art QSFP connector and the QSFP-DD connector of the present invention have the same height and width dimensions.

Figure 3A:
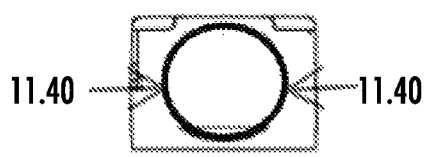
FIGS. 3A and 3B respectively show a comparison between the diameters of the cable inlet into the backshell of the cable connector of FIG. 1 and a prior art cable connector.
Figure 3B:

The space that has been cleared inside the backshell enables enlarging the diameter of the circular cable inlet 16 from 10.2 mm to 11.4 mm, as schematically shown in FIGS. 3A and 3B.

As will be understood by one of ordinary skill in the art in light of the present disclosure, the invention solves the problem of creating more room in the backshell. However, the additional requirement for the invention to achieve its goals is to minimize the diameter of the bundle of cables. In working with copper conductors a single cable comprising 16 twisted pairs of conductors would be too stiff for practical use; therefore, in one embodiment of the invention the bundling method described herein is used by combining two or more bulk cables, i.e. two eight-pair cables, four four-pair cables, or eight two-pair cables.

Figure 6:
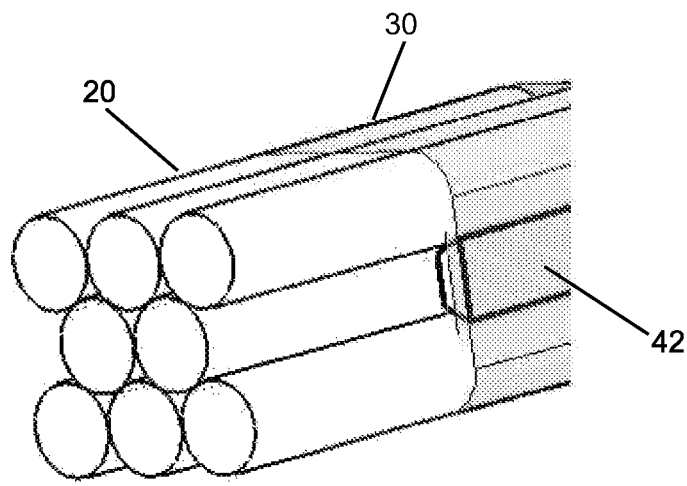
FIG. 6 schematically shows a cross section of the bundled cable of FIG. 5 taken near the beginning of the section covered by heat-shrink.

FIGS. 4A to 4F are photographic images that illustrate the stages of a process for bundling 16 pairs of conductors from at least two bulk cables and attachment of an over-mold strain relief to the bundle. In the 1$^{st}$ step (not shown) a length of the outer jacket of each bulk cable is removed to expose the twisted pairs of conductors and the braiding of each bulk cable is pulled back and untangled. In the 2$^{nd}$ step (FIG. 4A) the exposed lengths of the pairs of conductors from all bulk cables are bundled together by wrapping a thermally and electrically insulating film, such as DuPont's Kapton® around them. In the 3$^{rd}$ step (FIG. 4B) the cable shielding braid is arranged to minimize the thickness of the bundle. In the 4$^{th}$ step (FIG. 4C) the combined pairs are wrapped with glue covered cloth, e.g. 3M™ Acetate Cloth Electrical Tape, to simulate a single 16 pair bulk cable made up of the combined pairs from two or more bulk cables. In some embodiments, for example, when eight bulk cables are used, spacers 42 are added under the cloth 30 to maintain the shape of the bundle as shown in FIG. 6. In the 5$^{th}$ step (FIG. 4D) a section of the pairs from which the outer jacket was removed in the 1$^{st}$ step is covered with a heatshrink. Heatshrink materials appropriate for use with data cables are well known in the art and one of ordinary skill in the art in light of the present disclosure may select appropriate materials for this purpose, e.g. 3M™ Heat Shrink Thin-Wall Tubing. The heatshrink also covers part of the unremoved jacket on the bulk cables in order to provide an esthetic and clean appearance as well as to keep the shape of the bundle. In the 6$^{th}$ step (FIG. 4E) a strain relief is over-molded onto the bundled pairs and partially covering the heatshrink, in order to keep the outer surface of the bundle continuous and the pairs of conductors in place. In the 7$^{th}$ step (FIG. 4F) copper foil tape is wrapped around the shielding braid of the bundle of pairs of conductors after the molded strain relief to provide contact with the backshell for electrically grounding the backshell 12 to the bulk cable shield.

Figure 5:
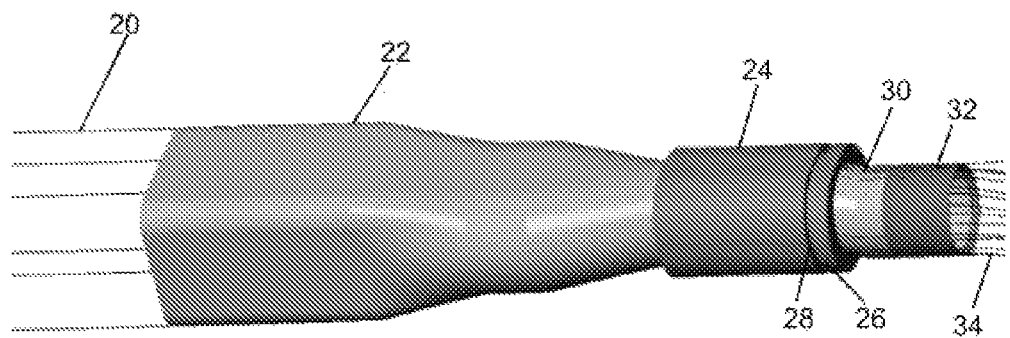
FIG. 5 schematically shows a portion of a bundled cable prepared according to the process illustrated by FIGS. 4A to 4F.

FIG. 5 schematically shows a portion of a bundled cable formed from eight bulk cables 20, each comprising two twisted pairs of 26 AWG copper conductor. The bundled cable is formed according to the process described with respect to FIGS. 4A to 4F. In the figure, the heat shrink is labelled with reference sign 22 and the over-mold strain relief with reference sign 24. At the forward end of strain relief 24 are a circumferential groove 28, followed by flange 26. Passing through the interior of the strain relief 24 are seen the cloth 30 and copper foil tape 32 wrapped around the shielding braid of the bundle of twisted pairs 34 of 26 AWG copper conductors.

Figure 7:
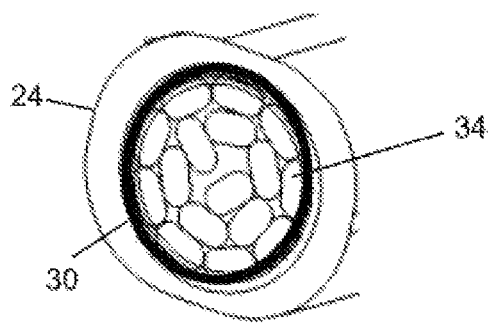
FIG. 7 schematically shows a cross section of the bundled cable of FIG. 5 taken near the forward end of the strain relief.

FIG. 6 schematically shows a cross section of the bundled cable of FIG. 5 taken near the beginning of the section covered by the cloth 30 with heat-shrink 22 removed and the cloth shown as transparent in order to see spacer 42. At this point the outer jacket of the eight bulk cables has not been removed and they have been collected into a square shape. As mentioned above two spacers 42 have been added in the second row (only one of which is seen in FIG. 6) to maintain the square shape. After the outer jackets have been removed the dimensions of the bundle of 16 twisted pairs becomes reduced and the bundle assumes a circular shape as symbolically shown in FIG. 7, which is a cross-section of the bundle near the forward end of strain relief 24. Note that the heat-shrink 22 is only partially covered by the strain relief 24 and the cloth 30 is partially covered by a portion of the heat-shrink 22 and by the entire strain relief 24.

Figure 8A:
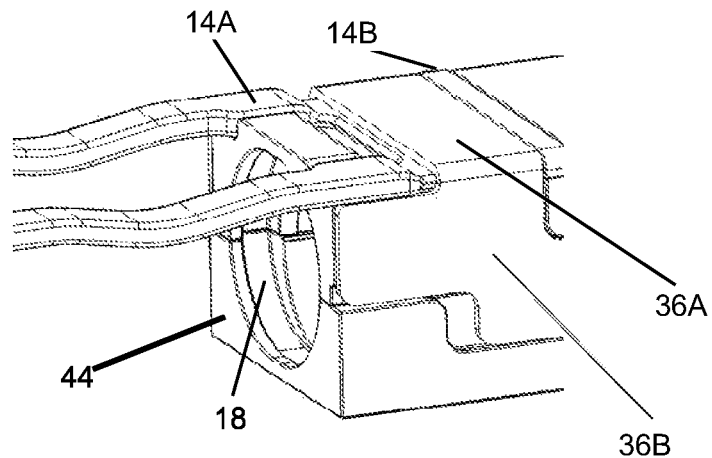
FIGS. 8A and 8B schematically show how the strain relief that is over-molded onto the bundled pairs of conductors is attached to the backshell of the connector.
Figure 8B:
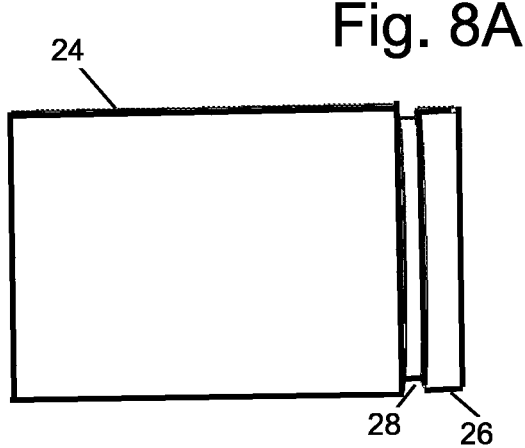

FIGS. 8A and 8B schematically show how the strain relief 24, which is over-molded onto the bundled pairs of conductors, is attached to the backshell 12 of the connector. When assembling the bundled cable to connector 10, flange 26 on strain relief 24 fits into groove 18 in backshell 12 and the end wall 44 of backshell 12 fits into groove 28 on strain relief 24. Thus, when all parts of connector 10 are finally assembled, the bundled QSFP-DD copper cable cannot be separated from the backshell 12.

Figure 9:
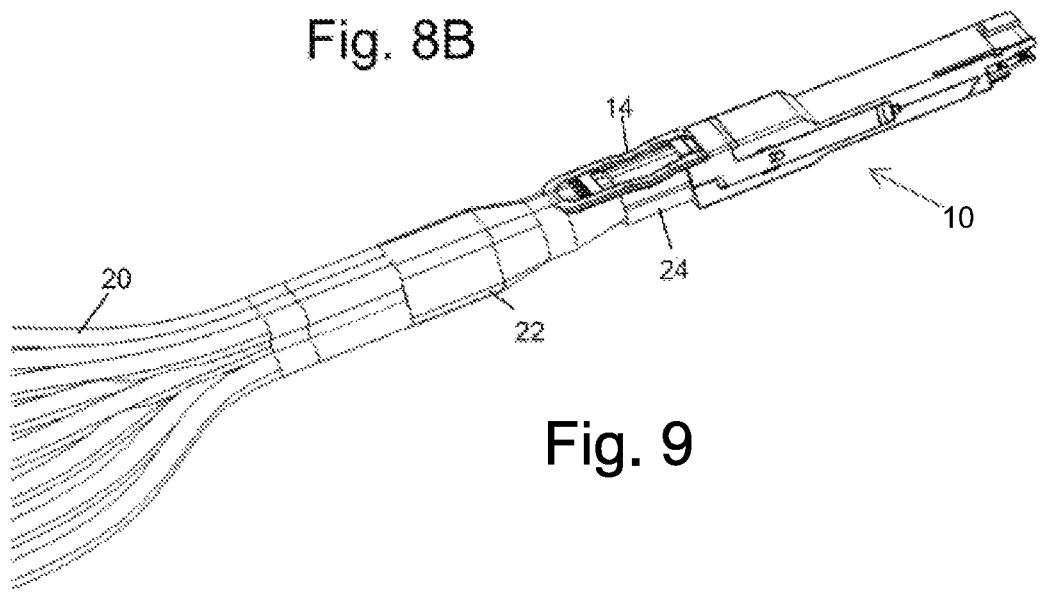
FIG. 9 schematically shows the bundled cable of FIG. 5 connected to the connector of the QSFP-DD cable connector of FIG. 1.

FIG. 9 schematically shows the bundled cable of FIG. 5 connected to the connector 10 of the QSFP-DD cable connector of FIG. 1.

Although embodiments of the invention have been described by way of illustration, it will be understood that the invention may be carried out with many variations, modifications, and adaptations, without exceeding the scope of the claims.

The invention claimed is:

1. A backshell of a Quad Small Form-factor Pluggable Double Density (QSFP-DD) plug configured to be connected to the end of a QSFP-DD copper cable, having external dimensions and shape which are compliant with the industry standards for a QSFP backshell, the backshell comprising:
   a) a locking latch comprising a top side and a side part;
   b) a pull tab comprising two sections that are located on opposite sides of the top side of the locking latch;
   c) a circular cable inlet located through an end wall of the backshell; and
   d) a circular groove located in the cable inlet;

wherein:
i) the edge of the top side of the locking latch ends at a location spaced away from the end wall of the backshell and the two sections of the pull-tab are connected by two strips of connecting piece that passes under the top side of the locking latch leaving a portion of the end wall of the backshell between them the two strips;
ii) a part of the portion of end wall is cleared away to enlarge the diameter of the cable inlet to the backend of the connector; and
iii) the circular groove located in the cable inlet and end wall of the backshell are configured to allow a flange on an over-molded strain relief to fit into the groove and to allow the end wall of the backshell to fit into a circumferential groove on the over-molded strain relief, thereby preventing separation of the QSFP-DD copper cable from the QSFP-DD connector.

2. The backshell of claim 1 configured to connect to a QSFP-DD copper cable, wherein the QSFP-DD copper cable is a bundled cable formed by bundling at least two bulk cables that together comprise 16 twisted pairs of copper conductors.

3. The backshell of claim 2, wherein the diameter of the copper conductors is 26 American Wire Gauge (AWG).

4. A backshell and cable assembly comprising a backshell as claimed in claim 1 and a QSFP-DD copper cable, which is a bundled cable formed by bundling at least two bulk cables that together comprise 16 twisted pairs of copper conductors.

5. The assembly of claim 4, wherein the diameter of the copper conductors is 26 American Wire Gauge (AWG).

6. The assembly of claim 4, wherein the bundled cable is formed from one of:
a) two bulk cables each containing eight twisted pairs of copper conductors;
b) four bulk cables each containing four twisted pairs of copper conductors;
c) eight bulk cables each containing two twisted pairs of copper conductors; and
d) sixteen bulk cables each containing two twisted pairs of copper conductors.

7. The assembly of claim 4, wherein the bulk cables are bundled together to form a bundled cable according to the following steps:
a) a length of the outer jacket of each bulk cable is removed to expose the twisted pairs of conductors and the braiding of each bulk cable is pulled back and untangled;
b) the exposed lengths of the pairs of conductors from all bulk cables are bundled together by wrapping a thermally and electrically insulating film around them;
c) the cable shielding braid is arranged to minimize the thickness of the bundle;
d) the combined pairs are wrapped with glue covered cloth to simulate a single 16 pair bulk cable;
e) a section of the pairs from which the outer jacket was removed in the first step and part of the unremoved jacket on the bulk cables is covered with a heatshrink;
f) a strain relief is over-molded onto the bundled pairs and partially covering the heatshrink; and
g) copper foil tape is wrapped around the shielding braid of the bundle of pairs of conductors after the over-molded strain relief.

8. The assembly of claim 7, wherein the thermally and electrically insulating film in the bundled cable is Kapton® manufactured by DuPont or the like.

9. The assembly of claim 7, wherein the glue covered cloth in the bundled cable is Acetate Cloth Electrical Tape manufactured by 3M™ or the like.

10. The assembly of claim 7, wherein spacers are added under the cloth to maintain the shape of the bundle.

11. The assembly of claim 7, wherein the heatshrink material in the bundled cable is Heat Shrink Thin-Wall Tubing manufactured by 3M™.

12. A method for manufacturing a backshell and cable assembly comprising a backshell as claimed in claim 1, and a QSFP-DD copper cable, which is a bundled cable formed by bundling at least two bulk cables that together comprise 16 twisted pairs of copper conductors, comprising the steps of:
a) removing a length of the outer jacket of each bulk cable to expose the twisted pairs of conductors and the braiding of each bulk cable is pulled back and untangled;
b) bundling the exposed lengths of the pairs of conductors from all bulk cables together by wrapping a thermally and electrically insulating film around them;
c) arranging the cable shielding braid to minimize the thickness of the bundle;
d) wrapping the combined pairs with glue covered cloth to simulate a single 16 pair bulk cable;
e) covering a section of the pairs from which the outer jacket was removed in the first step and part of the unremoved jacket on the bulk cables with a heatshrink;
f) over-molding a strain relief onto the bundled pairs and partially covering the heatshrink; and
g) wrapping copper foil tape around the shielding braid of the bundle of pairs of conductors after the over-molded strain relief.

13. The method of claim 12, wherein the thermally and electrically insulating film in the bundled cable is Kapton® manufactured by DuPont or the like film.

14. The method of claim 12, wherein the glue covered cloth in the bundled cable is Acetate Cloth Electrical Tape manufactured by 3M™ or the like.

15. The method of claim 12, wherein spacers are added under the cloth to maintain the shape of the bundle.

16. The method of claim 12, wherein the heatshrink material in the bundled cable is Heat Shrink Thin-Wall Tubing manufactured by 3M™ or the like.

* * * * *